(12) United States Patent
Morein (10) Patent No.: US 6,314,490 B1
(45) Date of Patent: Nov. 6, 2001

(54) METHOD AND APPARATUS FOR MEMORY ADDRESSING

(75) Inventor: Stephen L. Morein, Cambridge, MA (US)

(73) Assignee: ATI International SRL, Christ Church (BB)

( * ) Notice: Subject to any disclaimer, the term of this patent is extended or adjusted under 35 U.S.C. 154(b) by 0 days.

(21) Appl. No.: 09/432,874

(22) Filed: Nov. 2, 1999

(51) Int. Cl.[7] ..................................................... G06F 12/00
(52) U.S. Cl. .............................. 711/3; 711/129; 711/163; 711/202; 711/211
(58) Field of Search ................................. 711/2, 3, 217, 711/219, 211, 163, 129, 202

(56) References Cited

U.S. PATENT DOCUMENTS 5,694,567 * 12/1997 Bourekas et al. ....................... 711/3
6,128,718 * 10/2000 Schmisseur et al. ................. 711/212

* cited by examiner

*Primary Examiner*—Do Hyun Yoo
*Assistant Examiner*—Jasmine Song
(74) *Attorney, Agent, or Firm*—Vedder, Price, Kaufman & Kammholz (57) ABSTRACT

A method and apparatus for addressing memory in a processing system that includes a cache structure and supports multiple data streams is presented. The cache structure may be an N-way (where N is a number) cache that includes multiple sets or may be a simple set associative cache. A portion of the cache is divided into a number of blocks where each of the blocks is used to store data associated with a particular stream. Thus, different streams utilize different portions of the cache structure. In order to support the division of the stream portion of the cache into multiple blocks, addresses corresponding to stream data operations are modified for use in addressing the cache. The modification of the addresses includes the shifting bits of a shifted portion which may be located in the middle bit portion of the of the address by N bits and inserting an N-bit wide more significant portion of the address into the less significant position that lies between the shifted portion after shifting and a least significant portion. If it is determined that an access to the cache requires a subsequent access to another memory structure such as the main memory, the address used to address the cache is further modified to produce a address for accessing the other memory structure. Preferably, this includes discarding the more significant portion that was relocated to the less significant position and shifting the shifted portion back to its original position. The most significant portion of the address is then filled with a predetermined bit pattern to facilitate addressing the other memory structure.

23 Claims, 5 Drawing Sheets

METHOD AND APPARATUS FOR MEMORY ADDRESSING

FIELD OF THE INVENTION

The invention relates generally to addressing memory and more particularly to addressing memory in a processing system that includes a cache.

BACKGROUND OF THE INVENTION

Cache memory is often included in processing systems in order to increase memory accessing efficiency and speed. As is known, cache structures are often limited in size and therefore multiple memory addresses within the memory addressing space are mapped to the same address within the cache structure. Set associative caches are sometimes known to include multiple ways, or sets, that are used to cache different sets of memory locations. For example, the four way cache illustrated in FIG. 1 includes four separate sets. Each of the sets may be used to cache a different portion of the memory addressing space.

In some applications, different elements being processed may be characterized by a number of parameters. It may be efficient to treat each of these sets of parametric data as stream data, where stream data is accessed with unique memory instructions such that the stream data accesses are distinguishable from normal memory accesses. In one example, primitives in a video graphics processing system are characterized by a number of parameters including color, vertex coordinates, and possibly texture mapping information. Each of these different types of parametric data is stored as stream data and is accessed through stream data memory commands.

Because of the way stream data is accessed, prior art systems often allocated a particular set, or way, within a caching structure to stream data. A stream set illustrated in FIG. 1 may be such a set utilized for caching stream data. Allocating a particular set to stream data helps to ensure that stream data does not interfere with the caching of other types of data within the cache, which may result in inefficient cache usage.

Figure 1:
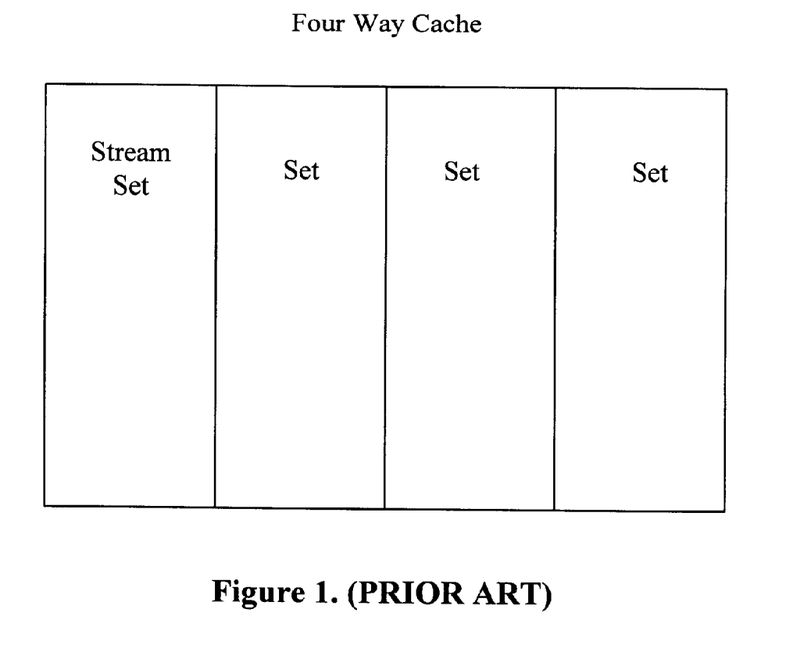
FIG. 1 illustrates a block diagram of a prior art four way cache structure.

Although the caching structure illustrated in FIG. 1 may perform adequately in applications where a single stream is supported, if multiple streams are supported in a system cache, cache "thrashing" may result as the different streams replace each other in the cache. When cache thrashing occurs, cached data is replaced before it can be effectively utilized by the processing system. Data stored in the cache is typically fetched in blocks, and such block fetching of stream data increases the likelihood of cached data being prematurely overwritten. Cache thrashing greatly reduces the benefits of including a cache in the system and can have a detrimental effect on overall system performance.

Therefore, a need exists for a method and apparatus for supporting multiple streams in a processing system that includes a cache structure.

DETAILED DESCRIPTION OF A PREFERRED EMBODIMENT OF THE INVENTION

Generally, the present invention provides a method and apparatus for addressing memory in a processing system that includes a cache structure and supports multiple data streams. The cache structure may be an N-way (where N is a number) cache that includes multiple sets or may be a simple set associative cache. A portion of the cache is divided into a number of blocks where each of the blocks is used to store data associated with a particular stream. Thus, different streams utilize different portions of the cache structure. In order to support the division of the stream portion of the cache into multiple blocks, addresses corresponding to stream data operations are modified for use in addressing the cache. The modification of the addresses includes the shifting bits of a shifted portion which may be located in the middle bit portion of the address by N bits and inserting an N-bit wide more significant portion of the address into the less significant position that lies between the shifted portion after shifting and a least significant portion. If it is determined that an access to the cache requires a subsequent access to another memory structure such as the main memory, the address used to address the cache is further modified to produce an address for accessing the other memory structure. Preferably, this includes discarding the more significant portion that was relocated to the less significant position and shifting the shifted portion back to its original position. The most significant portion of the address is then filled with a predetermined bit pattern to facilitate addressing the other memory structure.

By manipulating the addresses associated with stream data accesses, the address space corresponding to the cache structure is effectively segmented into a number of blocks. When each block is used to support a different stream, the efficiency with which the cache can be used in processing elements that include multiple streams can be greatly enhanced. The separation of the stream data from other types of data that may also be stored within the cache helps to ensure that the stream data does not induce cache thrashing.

Figure 2:
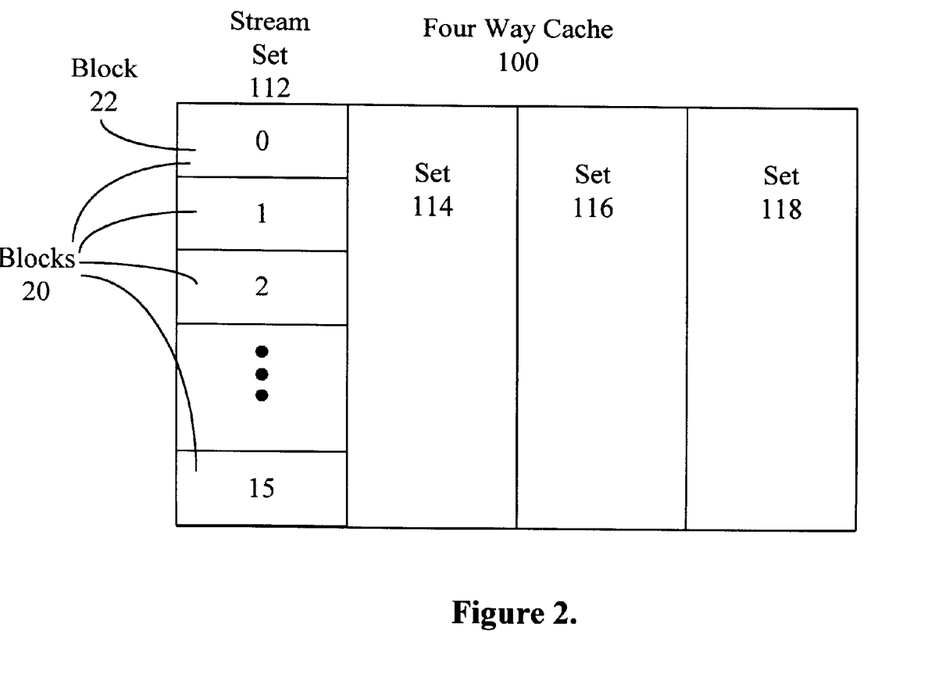
FIG. 2 illustrates a graphical representation of a four way cache structure that includes multiple blocks within a stream set in accordance with a particular embodiment of the present invention.

The invention can be better understood with reference to FIGS. 2–7. FIG. 2 illustrates a block diagram of a four way cache 100 that includes a plurality of sets 112–118. In the example illustrated, the stream set 112 is dedicated to caching of different streams. The additional sets 114–118 may be used to cache non-stream data, or may be used to cache stream data in a similar manner to that of the stream set 112. Note that the four way cache 100 is merely an example and larger multi-way caches could be utilized that include more sets. Similarly, a simple cache that does not include multiple sets could also be utilized.

The stream set 112 included in the four way cache 100 is shown to be divided into a number of blocks 20. Particularly, the stream set 112 is shown to be divided into 16 blocks.

Each of the blocks may be used to cache a different stream, wherein the streams include different types of data or of similar types of data. Thus, the number of blocks included in the stream set 112 may be based on the number of different streams that may be supported for processing operations in a particular system. Therefore, in other embodiments a smaller number of blocks may be supported in a similar cache structure as the cache 100 illustrated in FIG. 2.

Figure 3:
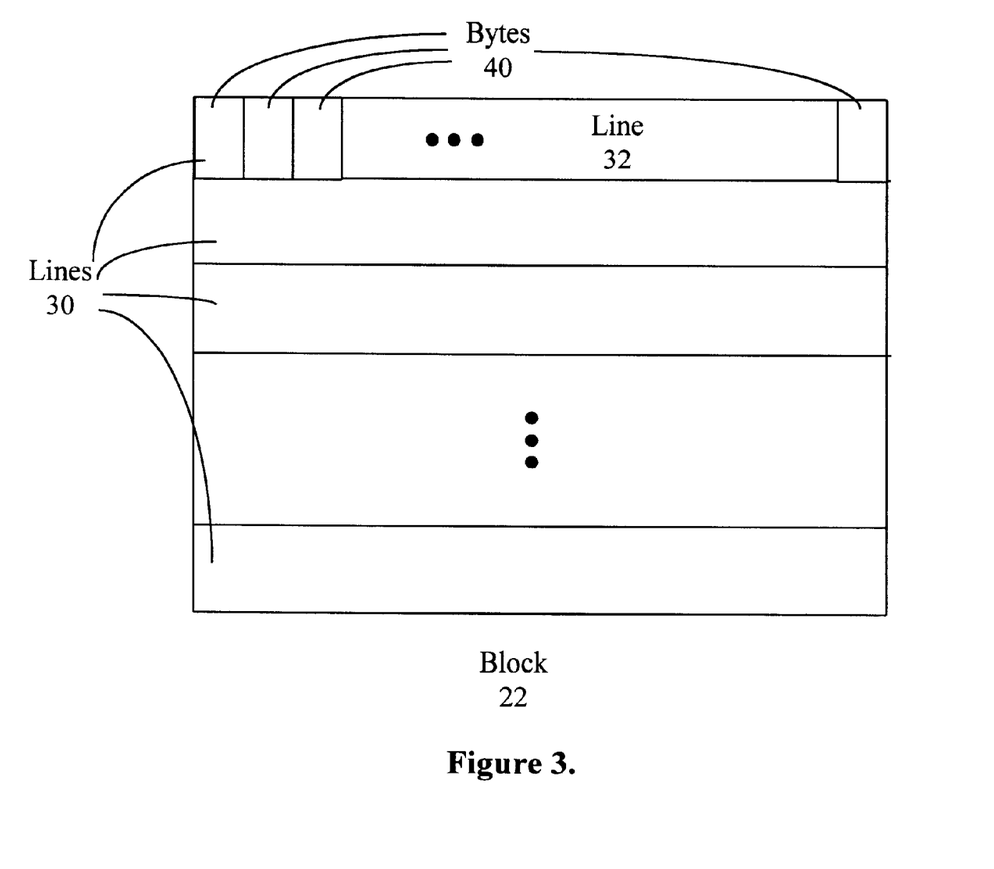
FIG. 3 illustrates a graphical representation of a more detailed view of a block within the stream set of the cache illustrated in FIG. 2.

FIG. 3 illustrates a more detailed view of the block 22 that is included in the stream set 112 of FIG. 2. As is illustrated, the block 22 includes a plurality of lines 30. Furthermore, each of the lines includes a number of bytes. Line 32 is shown to include 32 bytes 40. The specific example shown is for illustrative purposes, and one of ordinary skill in the art recognizes that various memory configurations may be used in different systems.

Figure 4:
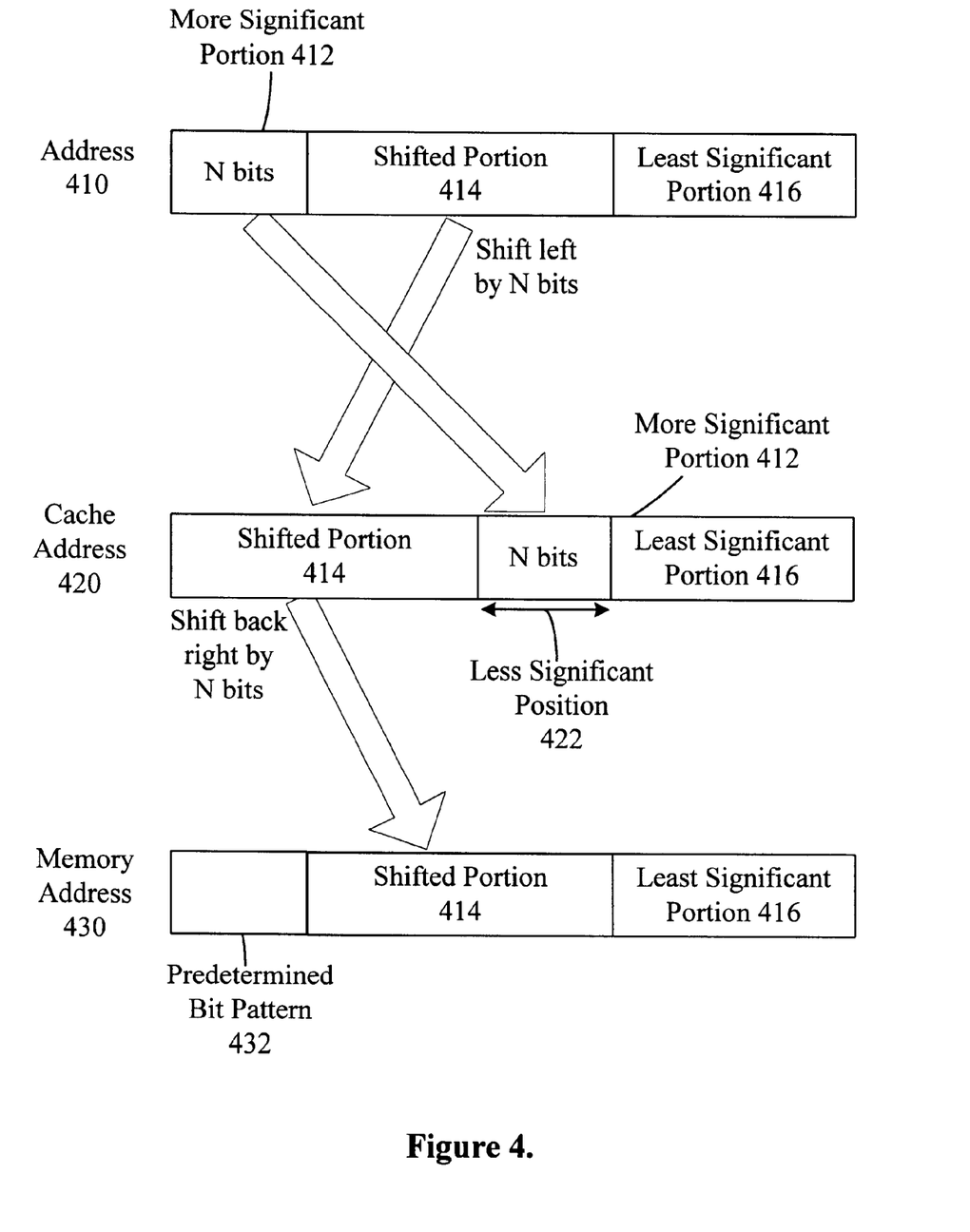
FIG. 4 illustrates a graphical representation of address modifications used to address memory in accordance with a particular embodiment of the present invention.

FIG. 4 provides a graphical representation of the different addresses utilized in a system in order to support multiple data streams in a cache structure. The address 410 represents the address as received from a processor for a stream data memory access. As is illustrated, the address 410 includes a more significant portion 412, a shifted portion 414, and a least significant portion 416. For the example illustrated in FIGS. 2 and 3, the least significant portion 416 would include nine bits. Five bits of the nine bits are used to index between the 32 bytes 40 included in a particular line, and the remaining four bits are used to index between the lines 30 within a particular block 22.

The more significant portion 412 of the address 410 is used in the addressing scheme for the cache in a manner that differs from that of prior art solutions. In prior art solutions, the most significant N bits, shown as the more significant portion 412, would have been included in the tag stored in the cache structure such that the address of the data currently stored in the cache could be accurately determined. The majority of the shifted portion 414 would also be included in the tag. However, in order to divide the portion of the cache used to support streams into a number of separate blocks for different streams, the most significant N bits are relocated to a less significant position 422 within the cache address 420, which is the address used to access the cache.

In one embodiment, the more significant portion of the address 410 is derived from a memory instruction corresponding to the memory access to which the address 410 corresponds. Thus, a different memory instruction could be used to indicate accesses to different streams as stored in the cache structure.

By relocating more significant portion of the address 410, the most significant bits of the address 410 are effectively used to divide, or partition, the stream-supporting portion of the cache into a number of blocks. Thus, the more significant portion 412 is positioned within the cache address 420 at the less significant position 422 and is used to index between the multiple blocks in the portion of the cache that is used to support streams. In the example illustrated in FIGS. 2 and 3, four bits will be used to index between the 16 blocks 20 included in the stream set 112. Note that the least significant portion 416 of the cache address 420 remains unchanged such that the indexing between individual lines within a block and the bytes within those lines is still accomplished by the least significant portion 416.

In order to shift the more significant portion 412 to the less significant position 422, the bits in the shifted portion 414 are left-shifted in a bit-wise manner by an equivalent number of bits as are present in the more significant portion 412. N bits within the more significant portion 412 allows for 2N blocks to be supported within the stream portion of the cache. Therefore, the shifted portion 414 must be left-shifted by N bits in order to make room for the more significant portion 412 to be inserted at the less significant position 422 that is shown to lie between the shifted portion 414 and the least significant portion 416 after the shifted portion 414 has been shifted. For the examples illustrated in FIGS. 2 and 3, the shifted portion 414 will be shifted by four bits, and the four bits included in the more significant portion 412 will be shifted to the less significant position 422.

If after accessing the cache it is determined that an access to main memory, or the memory which the cache supports, is required the cache address 420 must be further modified to create a memory address 430. Cache accesses that may result in the need for a memory access include an access that flushes a modified value stored in the cache such that the copy of that value in main memory must be updated. Modified data in the cache may be indicated through the use of a dirty bit, or through the use of similar data coherency maintenance techniques.

In order to generate the memory address 430 from the cache address 420, the more significant portion 412 as included in the cache address 420 is discarded. The shifted portion 414 is then right-shifted such that it returns to its original location (i.e. the position which it held in the address 410). Because the width of the address should be maintained, the most significant portion of the memory address 430 may be filled with a predetermined bit pattern 432. This predetermined bit pattern will determine where in memory the stream data is stored. In one example the predetermined bit pattern 432 may be all 0's such that stream data is stored in the lower addresses within memory. Note that the memory address 430 may also be generated using the address 410. In order to generate the memory address 430 in this way, the more significant portion 412 of the address 410 is replaced with the predetermined bit pattern 432.

Because stream data memory operations can be distinguished from normal memory operations (a different instruction is typically used), the conversion of the address 410 to the cache address 420 and any subsequent conversion to the memory address 430 is determined based on the type of memory access. Thus, such conversions may only be performed for addresses corresponding to stream data operations.

As is apparent to one of ordinary skill in the art, the modification of the address 410 to produce the cache address 420 and memory address 430 could be accomplished in a number of ways by a number of different devices including processors, state machines, logic circuitry, etc. The technique illustrated in FIG. 4 emphasizes the rearrangement of the various bit portions of the address to produce the cache address 420 and the memory address 430 to aid in understanding the invention.

Figure 5:
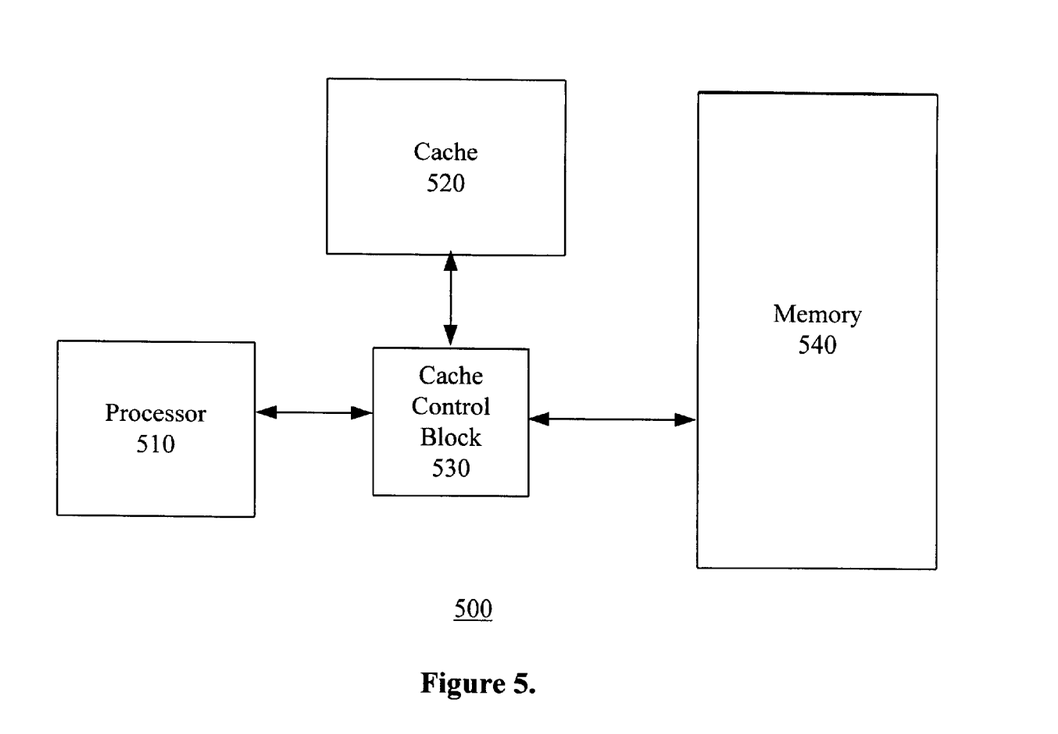
FIG. 5 illustrates a block diagram of a processing circuit in accordance with a particular embodiment of the present invention.

FIG. 5 illustrates a processing circuit 500 that includes a processor 510, memory 540, a cache 520, and a cache control block 530. The cache control block 530 is operably coupled to the processor 510, the cache 520, and the memory 540. The cache 520 includes a plurality of blocks used for stream data caching, and the cache 520 supports the memory 540 such that the cache 520 stores copies of at least a portion of the data stored in the memory 540 for use by the processor 510. The processor 510 issues at least one memory access request that includes an address. If the cache control block 530 determines that the memory access request corresponds to a stream data access, the cache control block 530 will manipulate the address received from the processor 510 prior to accessing the cache 520.

The modifications to the address received from the processor 510 by the cache control block 530 include the rearrangement of the bits of the address, which may be accomplished as described with respect to FIG. 4. Thus, the more significant portion of the address is shifted to a less significant position such that the more significant portion is used to index between the blocks used for stream data caching within the cache 520. This modification produces a cache address that is then applied to the cache 520 to determine if the data corresponding to the memory access request is included within the cache 520. Note that the memory access request may include a memory read operation or a memory write operation. If the data is determined to be included within the cache, the cache control block 530 can facilitate completion of the memory access request by performing a cache access to the cache 520 using the cache address generated.

If the cache access results in a determination that a memory access to the memory 540 is required, the cache control block 530 may further modify the cache address or modify the address received from the processor 510 to produce a memory address. This modification was illustrated in FIG. 4. Thus, the portion used to distinguish between different blocks within the cache 520 is discarded and any shifted portion is returned to its original location. A predetermined bit pattern is then included in the most significant portion and the resulting memory address is used to access the memory.

In one embodiment, the processor 510 is a video graphics processor that processes video graphic primitives. Primitives typically include a number of different parameters such as color data, primitive vertex data, texture mapping data, etc. Thus, these different types of primitive data may be structured as stream data such that individual blocks within the cache 520 are dedicated to a particular stream. Thus, one block could be used for color, another for vertex coordinate data, etc. Therefore, when a particular primitive was being processed, block load operations corresponding to the stream data for that particular primitive may enable the primitive to be processed in a more efficient manner as the parameters for that primitive are all included within the cache 520 simultaneously. This is a much preferred situation to that of prior art systems in which the fetching of stream data for different types of parameters may have resulted in cache thrashing.

Figure 6:
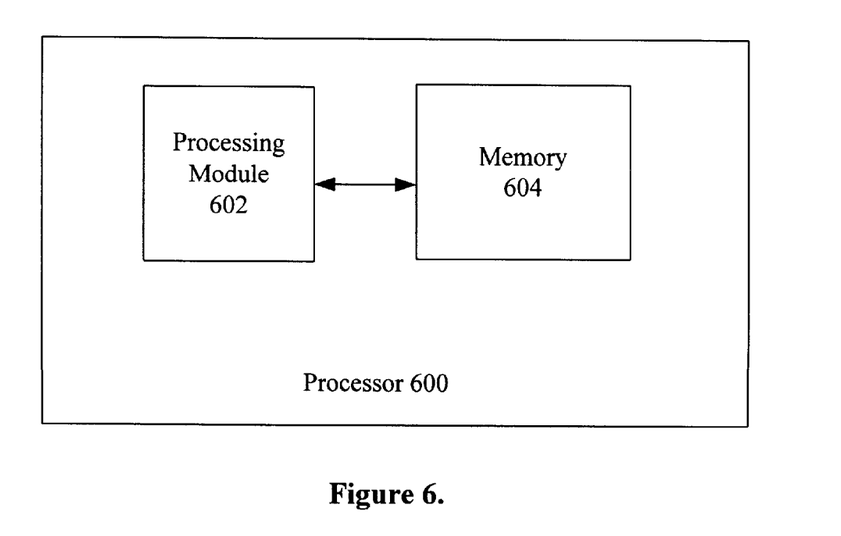
FIG. 6 illustrates a processor that may be used to perform a method for addressing memory in accordance with a particular embodiment of the present invention.
Figure 7:
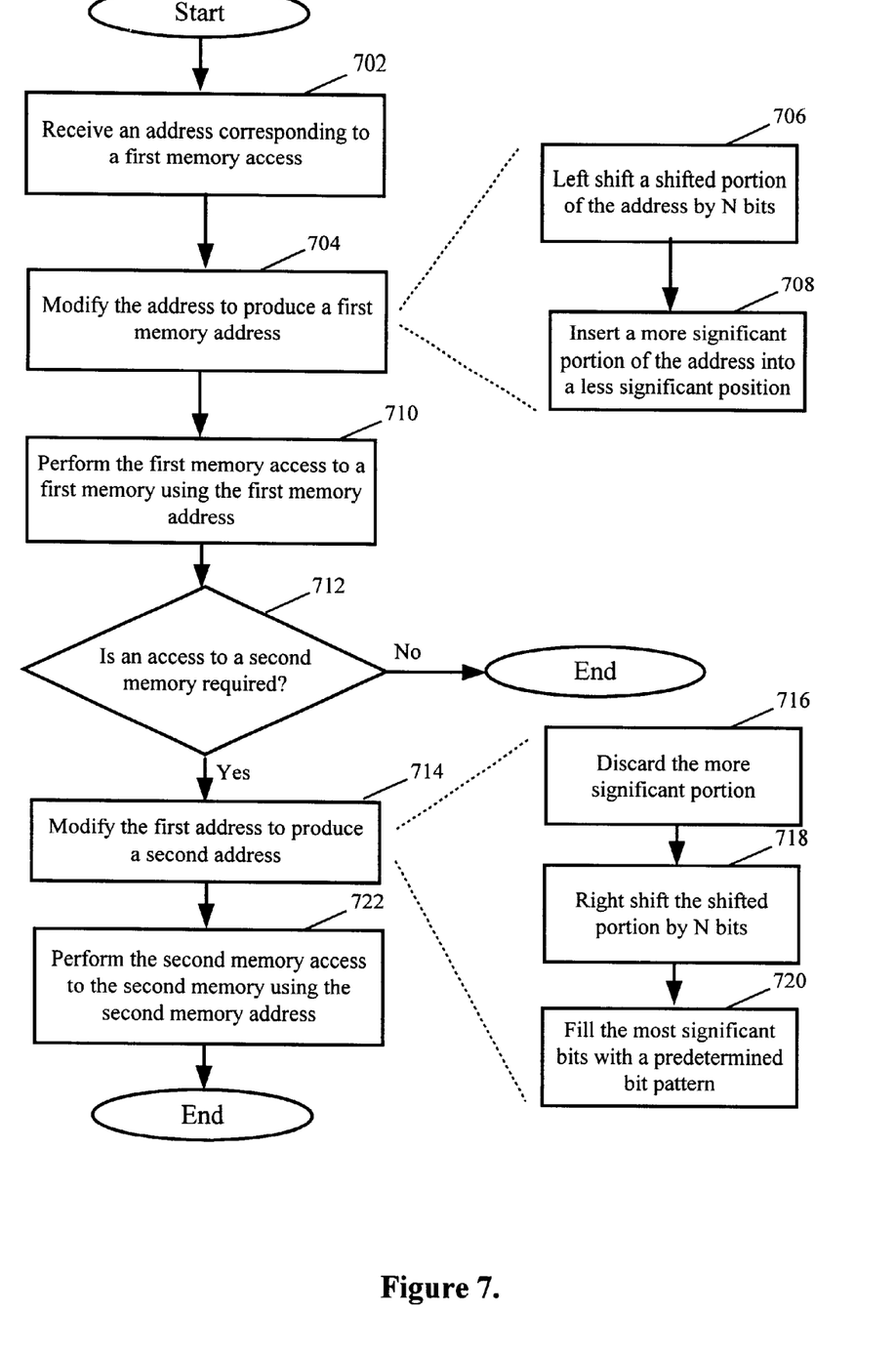
FIG. 7 illustrates a flow diagram of a method for addressing memory in accordance with a particular embodiment of the present invention.

FIG. 6 illustrates a processor 600 that may be used to perform the method for addressing memory illustrated in FIG. 7. The processor 600 of FIG. 6 includes a processing module 602 and memory 604. The processing module 602 may be a single processing entity or a plurality of processing entities. Such a processing entity may be a microprocessor, microcontroller, digital signal processor, state machine, logic circuitry, or any device that processes information based on operational or programming instructions.

The memory 604 may be a single memory device or a plurality of memory devices. Such a memory device may be read only memory device, random access memory device, floppy disk, hard drive memory, or any device that stores digital information. Note that when the processing module 602 has one or more of its functions performed by a state machine or logic circuitry the memory containing the corresponding operational instructions may be embedded within the state machine or logic circuitry. The memory 604 stores programming or operational instructions that, when executed, allow the processing module 602 to perform at least a portion of the method illustrated in FIG. 7. Note that the processor 600 may implement some of the functions of the method of FIG. 7 through software stored in the memory 604, whereas other portions may be implemented using hardware, or circuitry included within the processor 600. Thus, in some embodiments a mix of hardware and software may be used to perform the method of FIG. 7.

FIG. 7 illustrates a flow diagram of a method for addressing memory in a processing system. The method begins at step 702 where an address corresponding to a first memory access is received. At step 704 the address is modified as was described above such that a more significant portion of the address is moved to a less significant position of the address. This may be performed as is illustrated in steps 706 and 708. At step 706 a shifted portion of the address is left-shifted by N bits, where N is also the number of bits included in the more significant portion of the address that is being relocated. The more significant portion of the N bits is then inserted in the less significant position at step 708. The less significant position is the position that lies between the shifted portion after shifting and a least significant portion of the address.

At step 710 a first memory access to a first memory is performed using the first memory address. In one embodiment, the first memory is a cache, and the first memory address is used to access the cache in a manner that allows a portion of the cache to be divided up into a number of blocks used to support different streams. The number of stream buffers, or blocks, maintained within the cache may be based on the number of bits included in the more significant portion of the address. Thus, if the more significant portion includes N bits, $2^N$ stream buffers may be maintained within the cache. This is because the N bits can be used to index between the $2^N$ stream buffers. Thus, in one example, four bits may be included in the more significant portion such that 16 stream buffers are maintained within the cache. This example matches that described with respect to FIGS. 2 and 3 above.

At step 712 it is determined whether or not an access to a second memory is required based on the first memory access. Thus, in the case where the first memory is a cache, an access to a second memory, which may be main memory, may be required because a changed cache value is being flushed from the cache. In other cases, the access to the cache may be such that no access to the second memory is required. If it is determined at step 712 that an access to the second memory is required, the method proceeds to step 714.

At step 714, the first memory address is further modified to produce a second memory address. In other embodiments, the second memory address may be generated directly from the address received at step 702. The modification performed at step 714 may be performed as is illustrated in steps 716–720. At step 716 the more significant portion that was relocated to a less significant position within the first address is discarded. At step 718, the shifted portion, which had been shifted to the left earlier, is right-shifted by an equivalent number of bits such that it is returned to a location that corresponds to its original location in the address as originally received. At step 720, the bits in the second memory access that correspond to the location of the more significant portion in the original address are filled with a predetermined bit pattern. As stated earlier, the predetermined bit pattern will determine where in the second memory the stream data will be located.

Once the second memory address has been generated at step 714, the method proceeds to step 722 where the second memory access is performed. The performance of the second memory access utilizes the second memory address to access the second memory, which, as described earlier, may be the main memory, or the memory for which the cache structure is storing corresponding data. In an embodiment where the second memory is main memory, the second memory may also store the operational instructions executed by the processing module 602 of FIG. 6.

By modifying addresses received for stream data accesses, multiple blocks within a cache structure can be dedicated to the storage of stream data corresponding to different streams. This enables the multiple types of stream data for a particular element, such as a graphics primitive, to be stored within the cache structure simultaneously. As a result, operations dealing with different parameters can be performed in an efficient manner that reduces the probability of cache thrashing, or the constant overwriting of cache data. As stated earlier, the techniques described herein may be applied to one or more sets, or ways, included in a cache structure when a N-way cache is included in a system.

It should be understood that the implementation of variations and modifications of the invention in its various aspects should be apparent to those of ordinary skill in the art, and that the invention is not limited to the specific embodiments described. It is therefore contemplated to cover by the present invention, any and all modifications, variations, or equivalents that fall within the spirit and scope of the basic underlying principles disclosed and claimed herein.

What is claimed is:

1. A method for addressing memory, comprising:
   dividing a first memory into a plurality of sets;
   receiving an address corresponding to a first memory access;
   modifying the address such that a more significant portion of the address is exchanged with a shifted portion which has a less significant position in the address, the shifted portion identifying a particular set in the first memory and the more significant portion identifying a block in the particular set, wherein modifying the address produces a first memory address; and
   performing the first memory access to the first memory using the first memory address.

2. The method of claim 1, wherein modifying the address further comprises left-shifting the shifted portion of the address by N bits and inserting the more significant portion in the less significant position, wherein the less significant position lies between the shifted portion after shifting and a least significant portion, wherein the more significant portion includes N bits.

3. The method of claim 2, wherein the first memory is a cache.

4. The method of claim 3, wherein 2N stream buffers are maintained within the cache.

5. The method of claim 4, wherein performing the first memory access further comprises accessing data relating to video graphics processing.

6. The method of claim 5, wherein the data relating to video graphics processing includes at least one of color data, primitive vertex coordinate data, and texture mapping data.

7. The method of claim 3, further comprises:
   determining that a second memory access to a second memory is required based on the first memory access;
   modifying one of the address and the first memory address to produce a second memory address; and
   performing the second memory access to the second memory using the second memory address.

8. The method of claim 7, wherein modifying the first memory address to produce the second memory access includes:
   discarding the more significant portion of the address;
   right-shifting the shifted portion of the address by N bits; and
   filling a most significant portion of the second memory address with a predetermined bit pattern.

9. The method of claim 1, wherein the more significant portion of the address is derived from a memory instruction corresponding to the first memory access.

10. A processing circuit, comprising:
    a memory;
    a cache, wherein the cache is divided into a plurality of sets, each set including a plurality of blocks used for stream data caching, wherein the cache stores copies of at least of a portion of data stored in the memory;
    a processor, wherein the processor issues a memory access request that includes an address; and
    a cache control block operably coupled to the cache, the processor, and the memory, wherein the cache control block performs the functions of:
    receiving the address from the processor;
    modifying the address such that a more significant portion of the address is exchanged with a shifted portion which has a less significant position in the address, the shifted portion identifying a particular set in the cache and the more significant portion defines a block within the particular set, wherein modifying the address produces a cache address; and
    performing a cache access to the cache using the cache address.

11. The processing circuit of claim 10, wherein the cache control block modifies the address to produce the cache address by left-shifting the shifted portion of the address by N bits and inserting the more significant portion in the less significant position, wherein the less significant portion lies between the shifted portion after shifting and a least significant portion, wherein the more significant portion includes N bits.

12. The processing circuit of claim 11, wherein the cache control block performs the additional functions of:
    determining that a memory access to the memory is required based on the cache access;
    modifying one of the address and the cache address to produce a memory address; and
    performing the memory access to the memory using the memory address.

13. The processing circuit of claim 12, wherein the cache control block modifies the cache address to produce the memory address by discarding the more significant portion of the address, right-shifting the shifted portion of the address by N bits, and filling a most significant portion of the memory address with a predetermined bit pattern.

14. The processing circuit of claim 10, wherein the processor is a video graphics processor.

15. The processing circuit of claim 14, wherein stream data stored in the blocks of the cache includes video graphics processing data that includes at least one of color data, primitive vertex data, and texture mapping data.

16. A processor, comprising:
    a processing module; and
    instruction memory operably coupled to the processing module, wherein the instruction memory stores operating instructions that, when executed by the processing module, cause the processing module to perform functions that include:

modifying an address received for a first memory access such that a more significant portion of the address is exchanged with a shifted portion which has a less significant position in the address, the shifted portion identifying a particular set in a first memory and the more significant portion identifying a block in the particular set, wherein modifying the address produces a first memory address; and performing the first memory access to the first memory using the first memory address.

17. The processor of claim 16, wherein the operating instructions further comprise operating instructions that cause the processing module to perform the function of modifying the address by left-shifting the shifted portion of the address by N bits and inserting the more significant portion in the less significant position, wherein the less significant position lies between the shifted portion after shifting and a least significant portion, wherein the more significant portion includes N bits.

18. The processor of claim 17, wherein the first memory is a cache.

19. The processor of claim 18, wherein 2N stream buffers are maintained within the cache.

20. The processor of claim 19, wherein the cache memory stores data relating to video graphics processing.

21. The processor of claim 20, wherein the data relating to video graphics processing includes at least one of color data, primitive vertex coordinate data, and texture mapping data.

22. The processor of claim 16, wherein the operating instructions further comprise operating instructions that cause the processing module to perform additional functions that include:

determining that a second memory access to a second memory is required based on the first memory access;

modifying one of the address and the first memory address to produce a second memory address; and performing the second memory access to the second memory using the second memory address.

23. The processor of claim 22, wherein the processing module performs the additional function of modifying the first memory address to produce the second memory address by:

discarding the more significant portion of the address;

right-shifting the shifted portion of the address by N bits; and filling a most significant portion of the second memory address with a predetermined bit pattern.

* * * * *